United States Patent
Jones et al.

(10) Patent No.: US 11,334,841 B2
(45) Date of Patent: *May 17, 2022

(54) SYSTEMS AND METHODS FOR TRACKING A WOOD PALLET USING AN EMBEDDED TRACKING DEVICE

(71) Applicant: Creative Asset Tracking Solutions, LLC, Chapel Hill, NC (US)

(72) Inventors: Michael Brandon Jones, Chapel Hill, NC (US); Tyson Coy Steffens, Durham, NC (US)

(73) Assignee: CREATIVE ASSET TRACKING SOLUTIONS, LLC, Chapel Hill, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/101,808

(22) Filed: Nov. 23, 2020

(65) Prior Publication Data

US 2021/0073729 A1    Mar. 11, 2021

Related U.S. Application Data

(63) Continuation of application No. 16/731,491, filed on Dec. 31, 2019, now Pat. No. 10,846,648.

(Continued)

(51) Int. Cl.
  *G06Q 10/08* (2012.01)
  *B65D 19/38* (2006.01)
  (Continued)

(52) U.S. Cl.
  CPC ......... *G06Q 10/0833* (2013.01); *B65D 19/38* (2013.01); *B65D 2519/00029* (2013.01);
  (Continued)

(58) Field of Classification Search
  CPC ............ G06Q 10/0833; B65D 19/38; B65D 2519/00029; B65D 2519/00064
  (Continued)

(56) References Cited

U.S. PATENT DOCUMENTS

| 4,838,169 A | 6/1989 | Gladish |
| 5,971,592 A | 10/1999 | Kralj et al. |

(Continued)

FOREIGN PATENT DOCUMENTS

| DE | 202012008230 U1 | 10/2012 |
| FR | 2928350 A1 | 9/2009 |
| WO | 2008047353 A1 | 4/2008 |

OTHER PUBLICATIONS

ISA/US; International Search Report and Written Opinion for International Patent Application No. PCT/US19/69075 dated May 20, 2020, 12 pages.

(Continued)

*Primary Examiner* — Jose V Chen
(74) *Attorney, Agent, or Firm* — NK Patent Law

(57) ABSTRACT

A cavity is cut into a wooden structure (e.g., stringer, block, or deckboard) of a wood pallet such that an electronic tracking device can be embedded into the wooden structure for tracking the pallet. The cavity is shaped to allow for a sufficient thickness of remaining wood material surrounding the cavity to remain strong and also to allow for sufficient thinness so wireless signals can be reliably transmitted to/from electronics within the cavity. The remaining space within the cavity around the embedded tracking device is filled with a potting material to secure and protect the tracking device within the cavity. The tracking device monitors the location of the pallet and provides location data to a back-end system over a communication channel either (Continued)

directly or via a local hub. The back-end system performs analytics on the location data.

17 Claims, 6 Drawing Sheets

Related U.S. Application Data

(60) Provisional application No. 62/787,955, filed on Jan. 3, 2019.

(51) Int. Cl.
G05B 19/18 (2006.01)
G01S 19/13 (2010.01)

(52) U.S. Cl.
CPC .... *B65D 2519/00064* (2013.01); *G01S 19/13* (2013.01); *G05B 19/182* (2013.01); *G05B 2219/37355* (2013.01)

(58) Field of Classification Search
USPC .............................................. 108/51.11, 51.3
See application file for complete search history.

(56) References Cited

U.S. PATENT DOCUMENTS

| | | | |
|---|---|---|---|
| 6,814,287 B1 | 11/2004 | Chang et al. | |
| 8,077,040 B2 | 12/2011 | Muirhead | |
| 10,846,648 B2 * | 11/2020 | Jones | G06Q 10/0833 |
| 2004/0129185 A1 | 7/2004 | Giampavolo et al. | |
| 2004/0177791 A1 | 9/2004 | Lawson | |
| 2005/0076816 A1 | 4/2005 | Nakano | |
| 2005/0107092 A1 | 5/2005 | Charych et al. | |
| 2005/0241549 A1 | 11/2005 | Gordon | |
| 2007/0295822 A1 | 12/2007 | Kawai | |
| 2008/0035033 A1 | 2/2008 | Liebel | |
| 2008/0103944 A1 | 5/2008 | Hagemann et al. | |
| 2009/0320723 A1 | 12/2009 | Low | |
| 2010/0182150 A1 | 7/2010 | Edelstain | |
| 2010/0199891 A1 | 8/2010 | Miller et al. | |
| 2011/0068924 A1 | 3/2011 | Muirhead | |
| 2011/0095087 A1 | 4/2011 | Master et al. | |
| 2011/0180607 A1 | 7/2011 | Kennedy | |
| 2012/0273387 A1 | 11/2012 | Ivosevic et al. | |
| 2013/0145971 A1 | 6/2013 | Federl et al. | |
| 2013/0324151 A1 | 12/2013 | Lee et al. | |
| 2014/0102338 A1 | 4/2014 | Stevens | |
| 2014/0116300 A1 | 5/2014 | Brown | |
| 2014/0174327 A1 | 6/2014 | Whiteford | |
| 2014/0210614 A9 | 7/2014 | Muirhead | |
| 2014/0283714 A1 | 9/2014 | Wahl | |
| 2015/0151873 A1 | 6/2015 | Luis y Prado | |
| 2015/0274359 A1 | 10/2015 | Linares | |
| 2016/0257444 A1 | 9/2016 | Wilhelm | |
| 2018/0162588 A1 | 6/2018 | Segerstrom | |
| 2018/0322446 A1 | 11/2018 | Souder et al. | |
| 2018/0322453 A1 | 11/2018 | Lantz et al. | |
| 2019/0168912 A1 | 6/2019 | De Bokx et al. | |

OTHER PUBLICATIONS

WIPO; International Preliminary Report on Patentability for International Patent Application No. PCT/US19/69075 dated Jul. 15, 2021, 9 pages.

USPTO; Non-Final Office Action for U.S. Appl. No. 16/731,491 dated Mar. 20, 2020, 7 pages.

USPTO; Non-Final Office Action for U.S. Appl. No. 16/731,491 dated Jun. 18, 2021, 6 pages.

* cited by examiner

SYSTEMS AND METHODS FOR TRACKING A WOOD PALLET USING AN EMBEDDED TRACKING DEVICE

CROSS-REFERENCE TO RELATED APPLICATIONS

This application is a continuation of U.S. patent application Ser. No. 16/731,491 filed on Dec. 31, 2019, entitled "SYSTEMS AND METHODS FOR TRACKING A WOOD PALLET USING AN EMBEDDED TRACKING DEVICE", being issued as U.S. Pat. No. 10,846,648 on Nov. 24, 2020, which claims priority to U.S. Provisional Patent Application No. 62/787,955 filed on Jan. 3, 2019 by Creative Asset Tracking Solutions, LLC, entitled "SYSTEMS AND METHODS FOR TRACKING A WOOD PALLET USING AN EMBEDDED TRACKING DEVICE," with named inventors of Michael Brandon Jones and Tyson Coy Steffens, the entire contents of all of which are incorporated by reference herein.

TECHNICAL FIELD

The present invention relates to systems and methods for tracking wood pallets. More specifically, the present invention relates to systems and methods for cutting a cavity into a wooden structure of a wood pallet and embedding an electronic tracking device for tracking the pallet.

BACKGROUND

Pallets are commonly used for transporting product (e.g., on cargo ships, in trucks, etc.) and storing product in warehouses. Pallets are often moved using forklifts. Traditionally, pallets have been constructed of wood due to the relatively low cost of the wood, strength of the wood, and ease of assembling pallets made of wood.

Wood is a natural material that contains material imperfections and is porous, making it relatively flexible, prone to splintering or even breaking as a result of harsh contact, and susceptible to moisture.

By their nature, pallets are used in relatively harsh environments with widely varying characteristics. For example, a pallet may experience major swings in temperature, from sub-freezing conditions to very hot conditions (and everything in between). Similarly, a pallet may sit for an extended period of time in very dry climates baking in the sun, or it may sit in puddles and/or very wet or humid environments. A pallet experiences various stresses from the weight of the product being held on the pallet, as well as twisting/bending forces from the product shifting or when the pallet is moved. In addition, a pallet is often hit with significant force by forklifts or pallet jacks while being handled.

To solve some of the problems associated with wood pallets, pallets made of plastics and/or other composites have been manufactured. The material in these pallets is uniform and non-porous. The material can be molded into desirable shapes or configurations and can be formulated to exhibit specific qualities (e.g., strength, weight, etc.).

As the Internet of Things (IoT) has grown, more and more devices have become connected to networks. As part of this, it has become desirable to track pallets as they travel. However, attempts to track wood pallets by attaching a tracker pod onto the outside of the pallet have been unsuccessful because the tracker gets knocked off of the pallet due to the rough physical environment (e.g., knocked off by the forklift, knocked off by the product, etc.). Attempts to track wood pallets by embedding the electronics for tracking within the wooden components of the pallets have failed because: (1) the process and/or shape of the cutout for the embedded electronics degrades the structural integrity of the wooden component beyond an acceptable point; (2) the embedded electronics have not been able to broadcast/receive transmissions through the wooden walls of the pallet (which, because of their porous nature, may have high moisture content) at a thickness that is sufficiently robust for the structural integrity of the pallet; and (3) wood pallets are considered to be too inexpensive to be worth the cost of the embedded electronics for tracking.

Trackers may be embedded within plastic/composite pallets where cavities can be designed and integrated into the manufacturing process to receive the electronics. As mentioned above, however, these materials are expensive (approximately 5-10× the cost of wood, in most cases), and the up-front design cost of integrating the cavities into the plastic/composite pallets can be cost-prohibitive. Additionally, plastic/composite pallets generally only come in a standard 48"×40" configuration. To get a different configuration, there is usually an extremely high up-front cost, as well as quantity minimums, making it economically unfeasible in many instances.

WO2008047353A1 to Edelstain discusses problems implementing RFID technology in wooden pallets, such as that RFID tags cannot be implanted or attached to wooden pallets for dampness reasons, and that wooden pallets are subject to wetness and humidity shielding tracking signals. Edelstain proposes a passive smart tag that requires no power source and that is integrated in a sealed support cube that is placed in a central location on a wooden pallet.

U.S. Pat. Pub. No. 2014/0210614 to Muirhead and U.S. Pat. No. 8,077,040 to Muirhead both note problems with tracking wooden pallets, such as that wooden pallets deteriorate with use, they absorb liquids which can interfere with tracking, tracking devices on wooden pallets are subject to a high level of wear and tear, exterior tracking devices on wooden pallets can be damaged by the fork tine of a forklift, and that wood is not a suitable material for pallets that work within RF-rich settings. Muirhead proposes using plastic pallets with RFID pallet tags.

U.S. Pat. Pub. No. 2011/0068924 to Muirhead notes that wooden pallets have limited residual value, they present sanitation and moisture absorption difficulties, they generally deteriorate over time which results in significant inefficiencies, and that tracking systems are generally costly and unreliable within a wooden-pallet environment. As Muirhead explains, RFID systems have not been successfully integrated into wooden pallets because there are too many makes and models of traditional wooden pallets, a standard protocol has not been advanced, pallet handling procedures, damages and repair practices require a more robust tracking technology, radio frequencies are absorbed by wood, which makes reading RFID tags unreliable, and harsh operating conditions within the wooden pallet distribution system cause tracking devices to break and fail. To avoid these problems, Muirhead proposes using thermoformed polymer pallets.

U.S. Pat. Pub. No. 2008/0103944 to Hagemann et. al explains that wooden pallets are not durable, they absorb water, they are flammable, they are subject to pest and insect infestation, and they splinter or break easily. Hagemann proposes a composite pallet incorporating an active RFID tag.

U.S. Pat. No. 5,971,592 to Kralj et. al proposes integrated, reusable plastic composite pallets that can be easily disassembled and reassembled.

Accordingly, a need exists for systems and methods that provide for cost-efficient tracking of wood pallets that do not interfere with the use of forklifts/pallet jacks for moving the pallets while at the same time not significantly weakening the structure of the pallets.

SUMMARY

A cavity is cut into a wooden structure of a wood pallet using a high-speed precision cutting machine, such as a CNC cutting machine. The cavity is shaped such that it allows for a sufficient thickness of remaining wood material surrounding the cavity so that the wooden structure will retain sufficient strength/rigidity to allow the wood pallet to function as intended. At the same time, the cavity is also shaped such that the remaining wood material is thin enough to allow for signals to be reliably transmitted to/from electronics within the cavity. An electronic tracking device is embedded within the cavity and the remaining space within the cavity is filled with a potting material to secure and protect the tracking device within the cavity. The tracking device monitors the location of the pallet and provides the location data to a back-end system over a communication channel, where the back-end system performs analytics on the location data to identify patterns in the data.

A system for tracking a wood shipping device is disclosed. The system includes an electronic tracking device. The system further includes a cavity that has been cut out of a wooden structure of the wood shipping device. The shape of the cavity approximates the shape of the electronic tracking device such that the electronic tracking device can be completely embedded within the cavity. The system further includes potting material to fill remaining space within the cavity. The potting material fills the cavity such that the edge of the wooden structure is approximately flush.

A method for embedding an electronic tracking device within a wooden structure of a wood shipping device is disclosed. The method includes creating a cavity within the wooden structure of the wood shipping device. The cavity is of a custom shape to approximate an outline shape of the electronic tracking device. The method further includes inserting the electronic tracking device into the cavity. The method further includes filling remaining space within the cavity with potting material.

A method for tracking a group of wood shipping devices is disclosed. The method includes identifying a key shipping device within the group of wood shipping devices. The method further includes embedding an electronic tracking device within a cavity of a wooden structure of the key shipping device. The method further includes gathering location data with the electronic tracking device. The method further includes transmitting the location data to a back-end system. The method further includes performing data analysis on the location data to identify patterns in the location data. The method further includes performing forward-looking analysis using the identified patterns from the location data. The method further includes extrapolating the forward-looking analysis from the key shipping device to one or more other wood shipping devices within the group of wood shipping devices. The one or more other wood shipping devices do not include an embedded electronic tracking device.

In some embodiments, the wood shipping device is a wood pallet, a wood crate, or a wood skid.

In some embodiments, the cavity is cut out of the wooden structure such that the thickness of wood walls surrounding the cavity is no thicker than approximately 3 inches and no thinner than approximately 1/16 of an inch.

In some embodiments, the wooden structure is a stringer and the cavity is located approximately mid-way between a midpoint of the stringer and an inner edge of a notch on the stringer.

In some embodiments, the wooden structure is a block and the cavity is located approximately in the center of the block.

In some embodiments, the cavity is cut out using a CNC machine or a mortising machine.

In some embodiments, the cavity is cut out using a drill.

In some embodiments, one or more components of the electronic tracking device are arranged on a circuit board that has been customized to fit within a plurality of outer dimensions of the wooden structure of the wood shipping device.

In some embodiments, the electronic tracking device is in the shape of a cylinder.

In some embodiments, the electronic tracking device comprises a GPS unit, an antenna, and a power supply.

In some embodiments, the electronic tracking device includes a processor, a memory, and a communication interface configured to communicate with a back-end system for processing data from the electronic tracking device.

In some embodiments, the electronic tracking device is encased in a protective casing inside the cavity.

In some embodiments, the potting material is an RF-friendly potting material.

In some embodiments, the system includes a back-end system for processing data provided by the electronic tracking device.

In some embodiments, the system includes a local hub that communicates the electronic tracking device and further communicates with the back-end system.

In some embodiments, the method for embedding an electronic tracking device within a wooden structure of a wood shipping device includes transmitting data gathered from the electronic tracking device to a back-end system for processing the data.

DETAILED DESCRIPTION

The following description and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be (but are not necessarily) references to the same embodiment and such references mean at least one of the embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance regarding the description of the disclosure.

The subject matter disclosed herein includes systems and methods for embedding electronic tracking devices into wooden structures of a wood pallet. The tracking devices are embedded into a cavity that is cut into the wooden structures, and then surrounded and secured using a potting material.

Pallet Structure

Wood pallets consist of deckboards, stringers, and/or blocks. The deckboards, stringers, and/or blocks are connected to one another using fasteners, such as nails or screws. In one embodiment of the present invention, an electronic tracking device is embedded in a stringer of the wood pallet. In another embodiment of the present invention, an electronic tracking device is embedded in a block of the wood pallet.

In addition to wood pallets, the concepts described herein equally apply to skids and crates. Skids are wood pallets that do not have bottom deck boards. Crates are generally enclosed shipping containers, many of which often include or are built upon wood pallets or components of wood pallets. Because of this, a person of ordinary skill will recognize that the principles and concepts discussed here can be applied to skids and crates equally. An electronic tracking device may be embedded into a skid components and/or crate components using the same teachings presented here.

Figure 1:
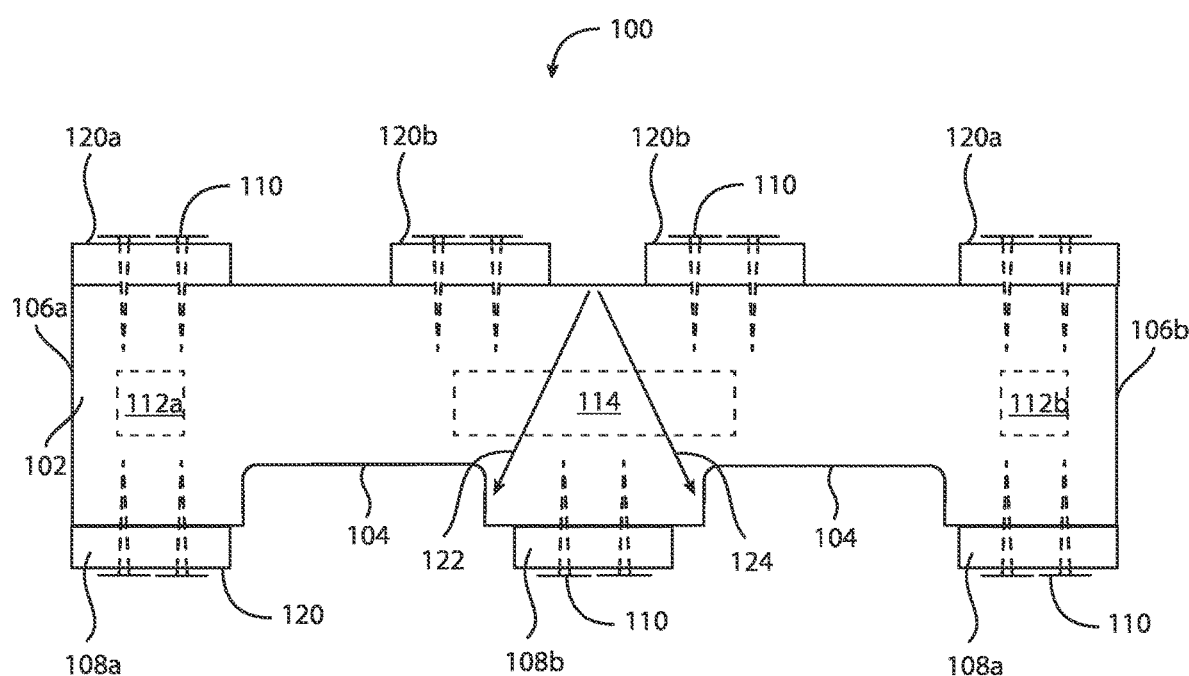
FIG. 1 shows an exemplary depiction of one type of wood pallet.

FIG. 1 shows an exemplary depiction of one type of wood pallet. As can be seen in FIG. 1, stringers 102 in wood pallets 100 often have notches 104 cut into them.

The ends 106a/106b of a stringer 102 are not an ideal location for placing an electronic tracking device. The ends 106a/106b of the stringers 102 take a disproportionate amount of forklift damage via forks spearing the end and splitting the grain. In addition, for proper stacking and racking functionality, most pallets/crates need to have their bottom lead board 108a flush or nearly flush with the end 106a of the stringer 102. Similarly, the outermost top deck boards 120a and 120d are usually flush (or nearly flush) with the ends 106a and 106b, respectively, of the stringer 102. This creates an area 112a/112b of the stringer with nails 110 penetrating the stringer 102 from both the top and the bottom, leaving little room for an electronic tracking device (as can be seen in FIG. 1). This area 112a/112b extends inwards from each end 106a/106b of the stringer 102 approximately 6 inches. The area 114 in the middle of the pallet presents a similar situation concerning nails 110 from bottom and top (as can be seen in FIG. 1).

If a pallet gets racked with end support, or is placed on top of a load that does not match the footprint of the pallet, it will be high centered (e.g., contact in the center while the ends are not) which focuses all of the stress at the middle of the stringer. For example, if the pallet 100 depicted in FIG. 1 were racked with end support, the stress would be concentrated along the force lines 122 and 124 shown in FIG. 1 (i.e., forces would act to compress the top of the pallet and stretch the bottom). For this reason, the center of the stringer 102 may be structurally compromised, which means that the middle of the stringer 102 may not be a structurally sound location to cut a cavity in the stringer 102 (for the exemplary stringer 102 shown in FIG. 1).

Figure 2:
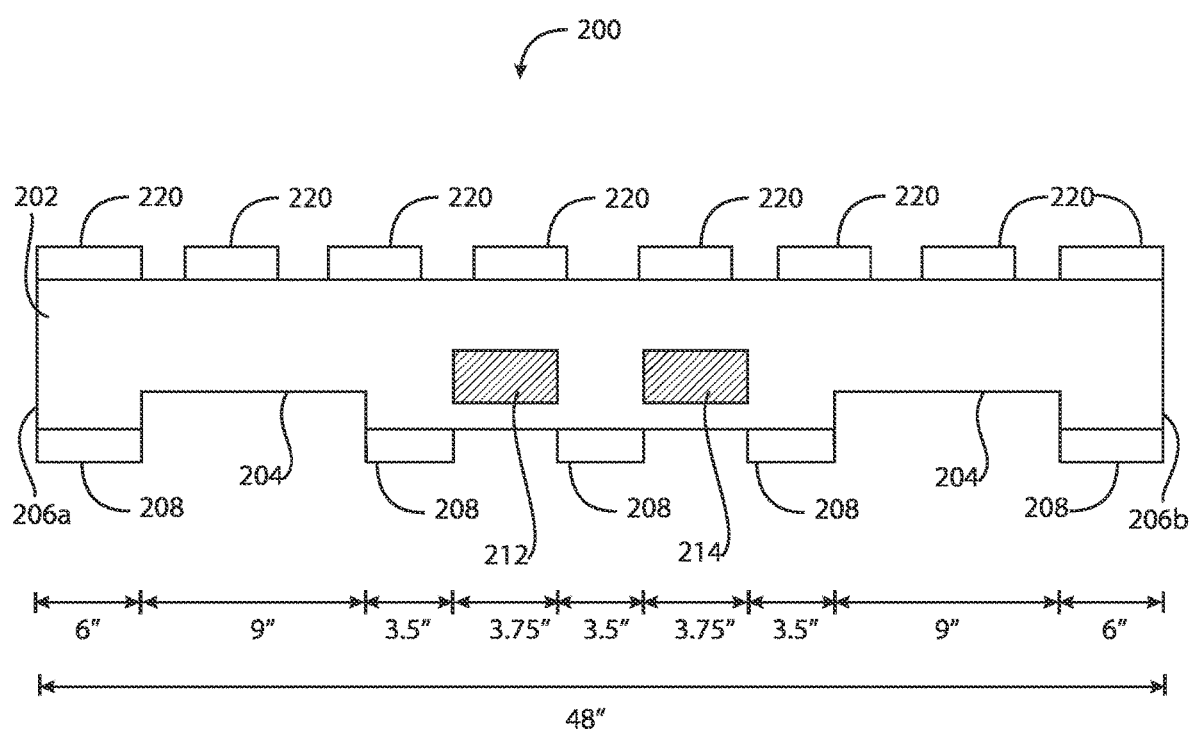
FIG. 2 depicts a side view layout of an industry-standard 48×40 "GMA" pallet.

FIG. 2 depicts a side view layout of an industry-standard 48×40 "GMA" pallet.

FIG. 2 shows dimensions of placements and openings for an industry-standard GMA pallet. The boxes 212 and 214 in FIG. 2 show ideal locations for a cavity cutout on an industry-standard GMA pallet. Applying the concepts discussed above in the context of FIG. 1 to this industry-standard pallet, the "danger zones" (i.e., where the stringers may be most structurally compromised) can be seen.

Tracking Device

An electronic tracking device is embedded into one or more wooden structures of a wood pallet. The tracking device may comprise multiple components, including a tracker, an antenna, and a power supply. These components may be integrated onto a single circuit board, or they may be integrated onto multiple circuit boards that are connected to one another using wires.

The tracking device may be any electronic device (or combination of electronic devices) that records or detects data related to position/location, movement/acceleration, distance, altitude, and/or orientation. The tracking device may be operable within any of the currently operating global navigation satellite systems, such as the United States Global Positioning System (GPS), the Russian Global Navigation Satellite System (GLONASS), the Chinese BeiDou Satellite Navigation System, and the European Union's (EU) Galileo. The tracking device may determine location by using GPS or other global positioning systems, by deriving location based on relative location of one or more hubs or routers to which the tracking device may connect over a wireless connection (e.g., triangulating between multiple known wireless hubs within a warehouse or other facility), by using WiFi sniffing, or by any combination of these methods of determining location. As will be understood by those skilled in the art, the resolution or accuracy of the tracking device's determined location may vary based on many factors, including which specific location technology is being used, the location of the pallet in which the tracking device is embedded (e.g., whether the pallet is indoors, outdoors, in a shipping vehicle, etc.), the characteristics of the specific tracking device being used (e.g., available power, available wireless connections, etc.), the characteristics of the pallet in which the tracking device is embedded, and the proximity and/or density of cellular towers, hubs, routers, or other tracking devices.

The tracking device may include various electronic components assembled on one or more circuit boards. The components of the tracking device include, for example, an antenna, a radio-frequency (RF) front end, one or more processors, and one or more memories. The antenna transmits/receives various wireless signals that are used by the tracking device to communicate with other electronic devices. The RF front end processes incoming and/or outgoing signals after they are received over the antenna or before they are sent over the antenna. The one or more processors perform additional processing of data received by the tracking device, and they handle additional computing tasks, such as communicating with other electronic devices. The one or more memories store computer instructions for the one or more processors, as well as tracking information of the tracking device.

The tracking device may also include one or more wireless communication technologies, such as, for example, a cellular transceiver, an RFID chip, a WiFi chip (IEEE 802.11), LoRaWAN (long-range wide-area network) connectivity, and/or a Bluetooth chip. The cellular transceiver may be connected to the one or more processors to allow for communication over one or more wireless networks (e.g., CDMA networks, GSM networks, LTE networks, 3G/4G/5G cellular networks, etc.) with other remote device for additional processing, reporting, and the like. The tracking device may also include one or more wired communication interfaces, such as, for example, USB connectivity, Ethernet connectivity, etc.

The tracking device may be configured to connect to other tracking devices or other IoT devices using one or more of the wireless communication technologies described above. In addition, the tracking device may be configured in a client-server configuration, such that the tracking device communicates with an upstream hub, router, or server, as is common in IoT configurations. The upstream hub, router, or server may be an edge device located in a warehouse or transportation vehicle (e.g., hub), or it may be a backend server implemented as a cloud server. The tracking device may connect to the upstream hub, router, or server either wirelessly or over a wired connection.

In some embodiments, the tracking device may include additional sensors for measuring other environmental factors, such as, for example, ambient temperature, relative humidity, moisture, sound/noise, light, etc.

The tracking device may gather location (and other related data, such as movement, altitude, etc.) continuously, intermittently, upon request, upon satisfaction of other criteria, or any scheme as is known in the art.

In one embodiment of the present invention, the tracking device is an off-the-shelf tracking device.

In some embodiments, the off-the-shelf tracking device has been disassembled and reassembled to make it more flat so that its shape more closely mimics the shape of the wooden structures (i.e., stringers and/or deckboards) of the wood pallet.

In one embodiment of the present invention, the tracking device uses off-the-shelf components that have been integrated onto a custom circuit board. The custom circuit board is designed to optimize the shape of the tracking device.

The tracking devices may be powered by batteries. The batteries used to power the tracking devices may be selected based on a size and/or configuration dictated by space limitations of the pallet into which the tracking device is being embedded, as well as reporting intervals and/or longevity requirements of the expected use case. The batteries may be rechargeable or replaceable, again depending on the specific use case.

There are two main factors to consider when optimizing the shape of the tracking device: (1) a shape that will allow for the smallest cutout possible such that the wooden component retains as much of its strength/rigidity as possible when a cavity for the tracking device is created; and (2) a shape that will allow for a thinness of wood surrounding the cavity such that signals sent to/from the tracking device are able to transmit through the wood surrounding the cavity. These two factors are somewhat in tension with each other, because a smaller cavity will allow for more surrounding wood and therefore better strength/ridigity of the wooden structure. However, the more surrounding wood will mean there is more material for the signals to travel through, possibly leading to choppy or dropped signals and faster use of the power supply (e.g., making a battery drain more quickly).

Traditionally, most circuit boards are laid out to have the smallest possible surface area and/or to maintain a relatively consistent aspect ratio to their rectangular shape. A custom circuit board layout allows the components to be placed into a shape and size specific for embedding the tracking device in the pallet.

In one embodiment, the tracking device is made from an off-the-shelf tracking device with an antenna for another application connected to it.

In one embodiment, the power supply may be one or more batteries. The batteries may be single-use or rechargeable. In one embodiment, the power supply may be one or more solar panels embedded on the outside of a wooden structure of the wood pallet and wired to the circuit board of the tracking device.

Figure 3A:
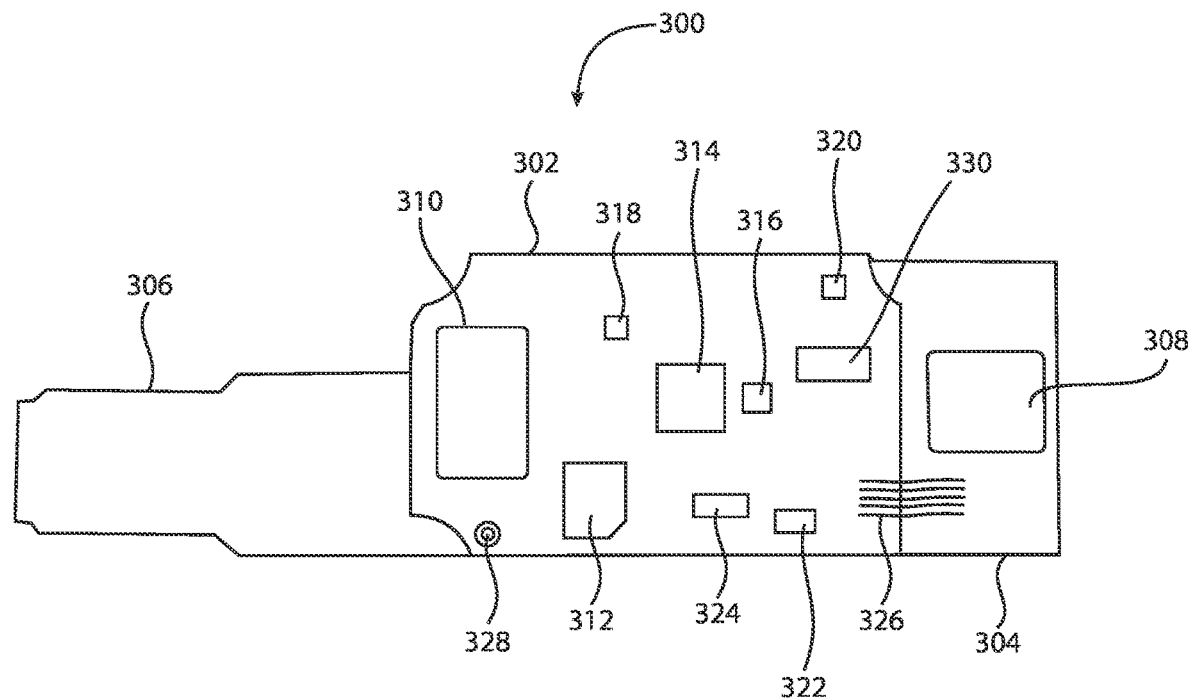
FIG. 3A shows a first exemplary circuit board configuration for the tracking device.
Figure 3B:
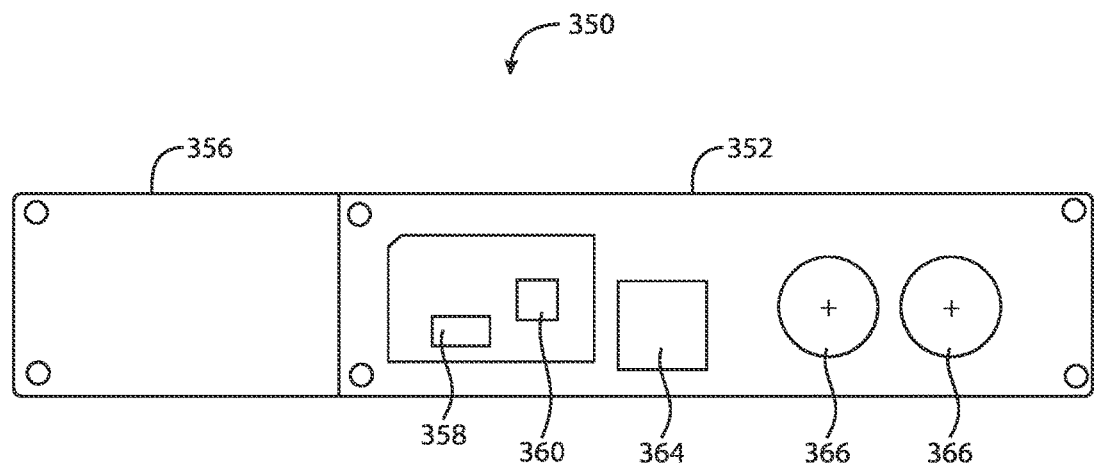
FIG. 3B shows a second exemplary circuit board configuration for the tracking device.

FIGS. 3A and 3B show two examples of circuit board configurations for the tracking device. The device 300 shown in FIG. 3A is an example of a modified off-the-shelf tracking device. In the device 300, an off-the-shelf tracking device was cut and reassembled. The cube on the right side of device 300 is the GPS unit 308, and that portion 304 of the board has been relocated and reconnected to make the device flatter. The portion on the left of the device 300 is an antenna 306 that has been integrated to the circuit board 302. The integrated antenna 306 provides for better transmission/reception of signals.

In one embodiment, circuit board 302 may include cellular radio 310, SIM card 312, temperature sensor 324 (for measuring ambient temperature), light sensor 322 (for measuring ambient light), moisture sensor 318 (for measuring humidity and/or liquid intrusion), barometric pressure sensor 320, accelerometer 316 (for measuring impact to the pallet or shifting of the pallet), Bluetooth chip 330, and processor 314. These components on circuit board 302 are connected to GPS unit 308 through wires 326. Circuit board 302 is connected to antenna 306 via external antenna connection 328. The electronic components of electronic tracking device 300 work together to allow the device to monitor the movements and ambient environment of the pallet in which the electronic tracking device 300 is embedded. The tracking and/or environmental data gathered by the electronic tracking device 300 may be stored locally within memory of the device 300 and then sent to a central processing unit (e.g., cloud server) via the cellular radio 310 when a cellular connection is available.

The circuit board 352 of the tracking device 350 in FIG. 3B is a different form factor that includes an integrated antenna 356. The height of the circuit board 352 on the bottom approximately matches the height of a battery bundle that is used as a power source for the tracking device 350 in one embodiment. The components of the electronic tracking device 350 are integrated onto the circuit board 352 in FIG. 3B, which allows for a reduced cavity size (as explained below). Electronic tracking device 350 includes processor 364, memory 360, a Bluetooth chip 358, and "coin cell" batteries 366. In the example electronic tracking device 350 shown in FIG. 3B, fewer electronic components are used, which means a smaller electronic tracking device 350, lesser power requirements, and a smaller cavity size. The overall size of the exemplary electronic tracking device 350 shown in FIG. 3B is smaller than the exemplary electronic tracking device 300 shown in FIG. 3A. The Bluetooth chip 358 allows the electronic tracking device 350 to communicate with other devices for tracking the pallet in which electronic tracking device 350 is embedded.

Cavity

As explained above, one problem with previous attempts to add a tracking device to a wood pallet is that if the tracking device is attached to the exterior of the wooden structures of the pallet (e.g., the stringers, blocks, deckboards), the tracking device often gets knocked off or broken by the product on the pallet or by the forklifts/pallet jacks that are used to move the pallets. To solve this problem, the tracking device is embedded into one or more wooden structures of the pallet. For the tracking device to be embedded into the pallet, a cavity is used for the tracking device to be embedded within. A cavity for embedding the tracking device is cut into one or more of the wooden structures of the pallet. In one embodiment, the tracking device is embedded into a cavity in one of the stringers of a pallet. In another embodiment, the tracking device is embedded into a cavity in one of the blocks of a pallet.

In one embodiment, the cavity is cut into an existing wooden structure of a pallet (e.g., a stringer of a pallet) using a CNC (computer numerical control) machine. Using a CNC machine allows the cavity to be cut quickly and efficiently as a complex shape. The complex shape of the cavity allows the shape of the cavity to best conform to the shape of the tracking device. The cavity is cut such that it (1) removes as little wood fiber as possible to retain the most strength and rigidity while at the same time leaving the greatest amount of intact stringer or block for nail application/retention; and (2) creates the least amount of open space within the cavity, resulting in less potting material, faster potting application, and quicker potting set times. The ability to cut precisely and quickly using a CNC machine allows the cavity location to be optimized to provide a sufficiently thin wooden wall to transmit signals through while at the same time maintaining required rigidity of the stringer/block.

In another embodiment, the cavity is cut into an existing wooden structure of a pallet (e.g., a stringer of the pallet) using a mortising machine. A mortising machine is another high-speed method of cutting that allows for custom cutting of shapes.

In other embodiments, the cavity may be cut into an existing wooden structure of a pallet using a laser cutter or other precision cutting mechanism.

Figure 4:
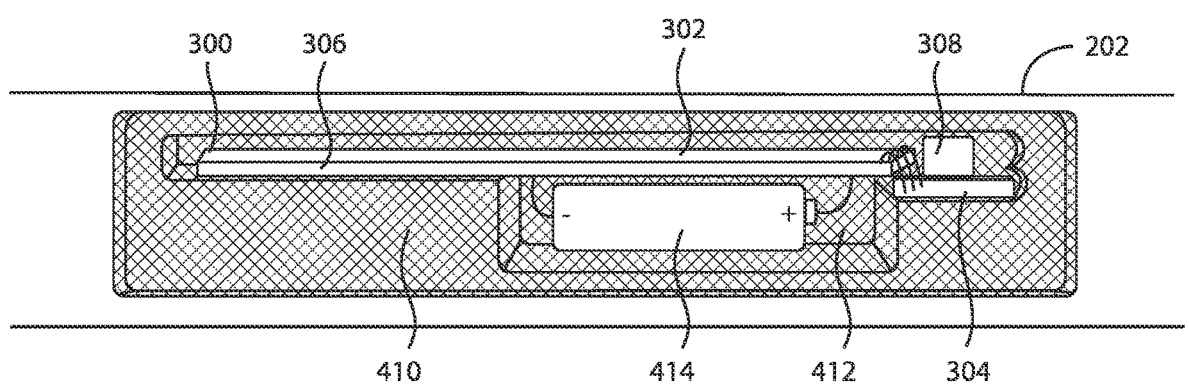
FIG. 4 shows a first example of a tracking device that has been embedded in a stringer prior to potting.

FIG. 4 shows a first example of a tracking device 310 that has been embedded in a stringer 202 prior to potting. The example of FIG. 4 shows a CNC-machined custom cutout 412 that matches the shape of the tracking device 310 to retain as much wood fiber as possible (for strength/rigidity) and to minimize the amount of potting material required (as well as the time required to apply the potting material and for the potting material to set/cure).

As FIG. 4 shows, the tracking device 300 from FIG. 3A is completely embedded within the cavity 412, such that when the potting (shown in cross-hatching in FIG. 4) is added to fill in the remaining space 410 and 412 within the cavity 412, the cavity 412 will end up being flush (or nearly/approximately flush) with the wooden structure 202 (e.g., stringer in this example). FIG. 4 also shows battery 414 connected to the underside of electronic tracking device 300.

Figure 5:
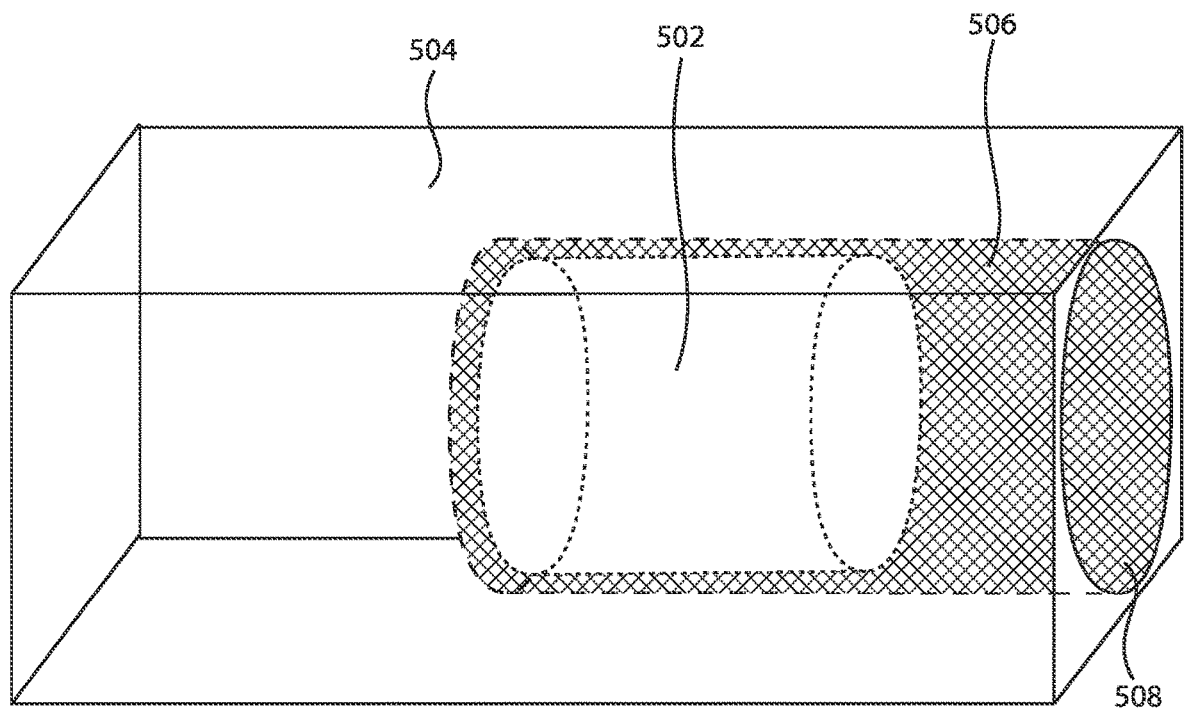
FIG. 5 shows a second example of a tracking device that has been embedded in a wooden structure of a pallet prior to potting.

FIG. 5 shows a second example of a tracking device that has been embedded in a wooden structure of a pallet prior to potting. Referring to FIG. 5, tracking device 502 has been embedded in a wooden structure 504 of a wood pallet. The example of FIG. 5 shows a cylindrical tracking device 502 embedded in a cylindrical cavity 506 with a circular face opening 508. The cylindrical tracking device 502 may be a self-contained pill-shaped tracking device, which includes one or more electronic components shown in FIGS. 3A and/or 3B, such as a GPS unit, a Bluetooth chip, a processor and/or memory, an antenna, and a battery. Cylindrical cavity 506 may be created in wooden structure 504 using a CNC machine or a drill bit, drill press, or the like. As shown in FIG. 5, the cylindrical tracking device 502 is completely embedded within cylindrical cavity 506 such that when the potting (shown in cross-hatching in FIG. 5) is added to fill in the remaining space within the cavity, the cavity will end up being flush (or nearly/approximately flush) with the wooden structure 504 at the circular face opening 508 at the edge of the wooden structure 504. The depth and the diameter of the cylindrical cavity 506 depend on the size of the wooden structure 504 into which the tracking device 502 is being embedded, as well as the size of the cylindrical tracking device 502. For example, in some embodiments, the cylindrical tracking device 502 may be deeply embedded into wooden structure 504 (as shown in the example of FIG. 5). In other embodiments, the cylindrical tracking device 502 may be shallowly embedded into wooden structure 504 (e.g., a 1.25" diameter tracking device embedded 0.75" deep into wooden structure). In one embodiment, the cylindrical tracking device 502 may be encased in a protective case (e.g., a plastic case) before being inserted into cylindrical cavity 506. In some embodiments, the protective case may include threads on the outer surface such that the protective case containing the cylindrical tracking device 502 may be screwed into cylindrical cavity 506. Cylindrical cavity 506 may be cut to include threads that receive the threads on the outer surface of the protective case.

Potting

Because the wood of a pallet is porous and carries water both within and around its fibers, the electronics of the tracking device are, in various embodiments, shielded from the moisture to provide long-term durability to the electronics. Additionally, the electronics of the tracking device are susceptible to impact and vibration, so they are, in various embodiments, protected from repeated impacts with the inside of the cavity during handling and road vibrations. To accomplish this, in various embodiments, a protective case is used to protect the tracking device (e.g., a plastic case). The tracking device is press-fit into the cavity and/or a liquid potting material, which can assume any shape needed.

Any liquid potting material that can actively bond with wood may be used. By using potting that will bond with the wood, it will have the effect of binding the walls of the wooden structure together, thereby limiting/minimizing the loss of structural integrity as a result of the creation of the cavity. Various formulations for the potting material may be used, such as RF-friendly potting material, fire-retardant potting material, waterproof potting material, etc.

Location of the Cavity

As explained above in the context of FIGS. 1 and 2, the cavity for embedding the tracking device is cut out of a wooden structure of a wood pallet. In one embodiment, the cavity is cut out of a stringer. In another embodiment, the cavity is cut out of a block. In yet another embodiment, the cavity is cut out of a deckboard.

The location of the cavity may be optimized based on the particular tracking device used and the type of wood pallet being used. For example, in some embodiments, the cavity is located between the midpoint of the stringer and the inner edge of the notch on the stringer (as shown in the exemplary boxes 212 and 214 in FIG. 2). By locating the cavity between the midpoint of the stringer and the inner edge of the notch of the stringer, that leaves the most wood available in the stringer at the mid-point and at the ends where fasteners (e.g., nails) are used to assemble the wood pallet (or crate, skid, etc.).

In other embodiments, the cavity may be located at the midpoint of the stringer, when deckboards are located further from the middle of the stringer. By locating the cavity at the midpoint of the stringer, that leaves the portion of the stringer where the forks of a forklift/pallet jack are used to pick up the load unchanged, which retains as much strength of the stringer as possible, at the point of the stringer that is the most stressed when the pallet is lifted by a forklift/pallet jack.

Regardless of where along the stringer the cavity (and, therefore, the embedded tracking device) is located, in some embodiments, the cavity is on the inward side of the stringer, so that it cannot be seen from around the pallet. In other embodiments, the cavity is on the outward side of the stringer, so that it can be seen and/or accessed from around the pallet (e.g. to repair/replace the tracking device).

As explained above in the context of FIGS. 1 and 2, the cavity should be located to optimize the strength of the components of the pallet/crate/skid. As also explained above, the wood thickness surrounding the cavity is important to optimize to retain strength of the components of the pallet/crate/skid. In one embodiment, the minimum wall thickness of the wood surrounding a cavity is 1/16" (i.e., 1/16 of an inch) and the maximum wall thickness is 3" (i.e., 3 inches).

Anything less than 1/16" for a wall thickness presents at least a couple problems. First, a wall thickness less than 1/16" would compromise the strength of the wooden component for most load-handling scenarios. Second, a wall thickness less than 1/16" would expose the tracking device to potential damage in most realistic handling environments (e.g., a forklift or even pallet jack glancing off of a stringer wall of less than 1/16" would almost certainly pierce the tracker's cavity, exposing it to outside elements). Third, a wall thickness less than 1/16" would not leave enough material to account for natural variation in industrial-grade lumber to allow for the fabrication of trackable pallet components on a production scale. Any thinner than 1/16", and there are likely to be significant number of "blow outs," where the cavity would penetrate the outer wall of the beam.

Anything greater than 3" for a wall thickness may present problems for maintaining a reliable signal through the wood material. With the current state of GPS and antenna technology (e.g., cellular antennas) that can be used with an electronic tracking device, a wall thickness greater than 3" would prevent the tracker in the pallet component from reliably establishing GPS satellite locks or otherwise identifying its location and reporting that or any other location over a wireless (e.g., cellular) network. Of course, even with a wall thickness greater than 3", the electronic tracking device may be able to, under the right conditions, get a GPS signal lock and also connect to a cellular tower, it would not be able to do so consistently and/or reliably. Additionally, the natural variations in wood fiber density of the wooden structures, variations in moisture content of the wooden structures, and variations in the environments that pallets pass through and/or be staged in (e.g., trucks, pallet yards, manufacturing plants and distribution centers) would prevent pallets components with a wall more than 3" thick from providing data reliably and with enough continuity to serve the desired applications.

In some embodiments, the cavity (and, therefore, the embedded tracking device) is located on a block. When the cavity is located on a block, it is approximately centered in the block.

In some embodiments, the cavity (and, therefore, the embedded tracking device) is located on a deckboard (either a lower/bottom deckboard or a top/upper deckboard), midway between the midpoint and the end of the deckboard. As with the stringer, when the cavity is located mid-way between the midpoint and the end of the deckboard, that leaves wood fiber in tact in the middle and end of the deckboard to allow for nails/fasteners.

In some embodiments, the cavity (and, therefore, the embedded tracking device) is located on a deckboard, at the mid-point of the deckboard. As with the stringer, when the cavity is located at the midpoint of the deckboard, that leaves wood fiber in tact between the midpoint and the end of the deckboard to retain strength/rigidity, which is where the deckboards are the least supported by other structures of the pallet.

In some embodiments, the various components of the electronic tracking device (e.g., the antenna, the GPS unit, and the power supply) may be located in multiple separate cavities on separate wooden structures of the pallet/crate/skid. In such embodiments, the components are connected to one another using wiring on the inside surfaces of the pallet/crate/skid such that the wires are located out of the way from where the load is placed or the forklift/pallet jacks are inserted.

Replacement Pieces

In some embodiments of the present invention, the tracking device may be embedded in a standalone wooden structure that can later be incorporated into a pallet when the pallet is being assembled. For example, the tracking device may be embedded in a standard-sized stringer in a fully self-contained manner, such that the stringer with the tracking device can be simply swapped for an existing stringer in an existing pallet, which allows for conversion of an existing pallet into a trackable pallet, without having to cut a cavity into an existing structure of the pallet.

Tracking Method

Once the tracking device is embedded within the pallet, the pallet can be tracked. Various methods of tracking the pallets may be used, as is appropriate for the particular use case/application. For example, the tracking device may check its location continuously. The tracking device may check its location at periodic time intervals (e.g., every second, minute, hour, or other interval). The tracking device may check its location based on expected tracking—for example, if the shipment is expected to reach a particular location at a particular time, the tracking device may check its location at periodic intervals centered around the expected time. The tracking device may check its location in response to an event occurring, such as detection of movement (e.g., when a pallet goes from stationary in a warehouse to being moved by a forklift). The tracking device may check its location in response to a signal received from a remote device or a back-end system (e.g., server) over a wired/wireless interface (e.g., a location request).

As the pallet is tracked using the tracking device, the movement data and/or the location data over time can be analyzed (either locally by one or more processors of the tracking device, or remotely by a remote device) to identify holes in the route, to detect and track merchandise loss, and to generate data for forward-looking analytics.

The tracking device may store movement/location data in a local memory. This may be done for on-board analytics of the data. This may also be done when there is no communication channel available (e.g., when the pallet is in the middle of the ocean outside the reach of cellular signals, or when the pallet is underground in a storage facility where there is no cellular signal), such that the information can be stored and then transmitted later when a communication channel becomes available.

Raw location data gathered by the tracking device may be sent to a remote device for processing (over a communication interface). The remote device may be a computer or a cloud server. The remote device may perform additional processing to for data analytics to identify trends or patterns in the location data.

Depending on the type of analysis being performed on the data and the goals of the data analysis, it may not be necessary to track all wood pallets in a particular shipment. For example, in one embodiment, key pallets within a shipment are identified, and only those pallets are tracked. From the movement/actions of the tracked pallets, the movement and actions of the larger population of pallets can be inferred. The number of key pallets to be tracked may be determined to provide a desired level of statistical significance.

Remote Processing

In one embodiment, the tracking device communicates over a network (e.g., a wired or wireless connection) with a back-end system, which, as explained above, may process data from the tracking device. The back-end system may also communicate over a network (e.g., wired or wireless connection) with other computing devices, such as, for example, cellular phones (e.g., Apple iPhone, Android devices) and network-enabled devices (e.g., desktop computer, laptop computer, tablets, netbooks, 2-in-1 computers, etc.).

Figure 6:
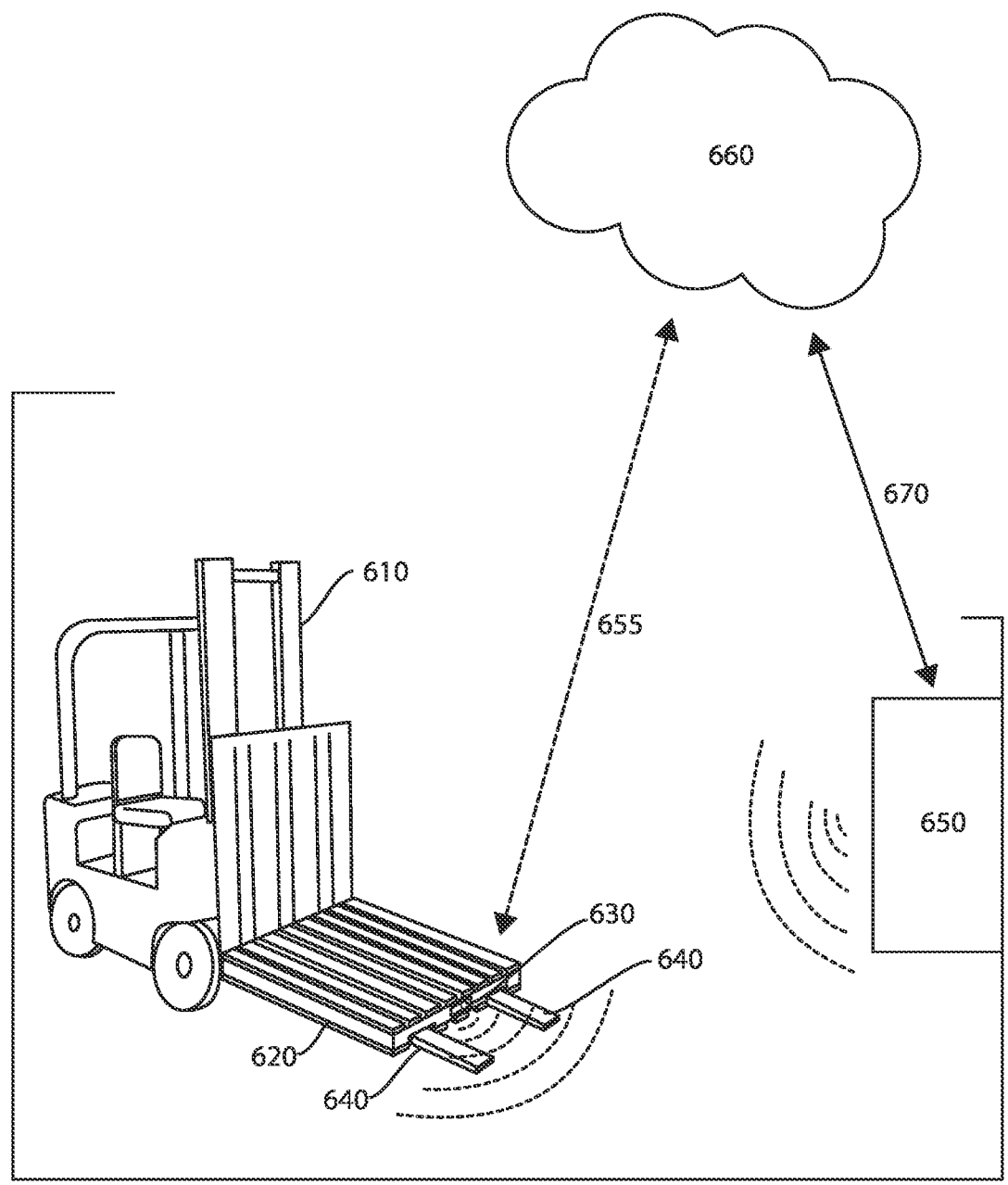
FIG. 6 shows an exemplary system architecture with a wooden pallet with a tracking device embedded.

FIG. 6 shows an exemplary system architecture with a wooden pallet with a tracking device embedded. Referring to FIG. 6, pallet 620 may be located within a warehouse or other facility. Pallet 620 includes electronic tracking device 630 embedded within the pallet in accordance with the teachings disclosed herein. The pallet 620 may be lifted and/or moved by forklift 610. The forklift tines 640 avoid the electronic tracking device 630. The electronic tracking device 630 is located in accordance with the teachings disclosed herein such that the radio signals experience minimal interference, and the wall thickness of the wooden structure is such that the strength of the wooden structure is not significantly compromised. Electronic tracking device 630 determines the pallet location using either GPS or by triangulating with other devices, such as local hub 650, as explained above. Electronic tracking device 630 communicates with back-end system 660, which is implemented as a cloud system. The communication between electronic device 630 and back-end system 660 may be directly through wireless connection 655 (e.g., cellular, WiFi, LoRaWAN, etc.) or via a local hub 650. Electronic tracking device 630 communicates with local hub 650 using various types of wireless communication technologies, as described above, for example, Bluetooth, WiFi, RFID, or the like. Local hub 650 communicates with back-end system 660 via connection 670, which may be either a wireless (e.g., cellular, LoRaWAN, etc.) or a wired connection (e.g., Ethernet).

In some embodiments, as explained above, the system architecture may include one or more hubs, routers, or servers located between the tracking device and the back-end system. In such a configuration, one or more tracking devices within a specific location may communicate with a local hub/router/server, and the hub/router/server relays that information upstream to the back-end system. For example, a warehouse may include one or more local hubs, routers, or servers with which tracking devices in pallets located within the warehouse communicate. The local hub/router/server in turn communicates with the back-end system. In another example, a shipping vehicle, such as a truck, may include a mobile hub mounted in the truck that communicates with tracking devices of pallets being transported by the truck. The tracking devices may communicate with the hub over a short-range wireless communication link, such as WiFi, Bluetooth, NFC, or the like. The hub/router/server may be connected to the back-end system either wirelessly or over a wired connection, often depending on the geographic location of the hub/router/server. The local hub, router, or server may run on hardwired power, or they may use other types of power, such as solar power or battery power, depending on the geographic location (e.g., remote installations may not have access to hardwired power). They may use a combination of the various power sources, for example, such that they use solar power when available and fall back to a hardwired line with the solar power is insufficient. Mobile hubs may be hardwired into the power system of the shipping vehicle (e.g., a truck's power system) to supply power when in transit.

The back-end system may include a processor, a memory, and a database. The processor may be any type of processor known in the art to be suitable for servers. The memory may be any type of memory known in the art to be suitable for servers. The database may be part of the back-end system, or it may be made up of one or more separate units that are connected to the back-end system. The back-end system may include "cloud" functionality for managing multiple data repository and/or computer functions that are distributed across multiple physical servers. As such, it is envisioned that the system may be implemented in the cloud and/or be cloud-based. In one embodiment, the back-end system may be implemented using Amazon Web Services ("AWS"). The back-end system may run any operating system or embedded software.

The processing performed by the back-end system may incorporate data from other, unrelated pallets being tracked. The processing may further use machine-learning or artificial intelligence to identify patterns.

The systems and methods disclosed herein may be implemented on purpose-built devices such as a custom built device with assembled hardware or the like. Additionally, the methods and systems disclosed herein could be implemented on existing RF communications devices that utilize communication modules embodying Wi-Fi®, Bluetooth®, cellular long term evolution (LTE®), or many other communications systems and devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Rodin®, (Wand®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for tracking a wood shipping device, the system comprising:
an electronic tracking device encased in a cylindrical protective case shallowly embedded in a cylindrical cavity bored into a wooden structure of the wood shipping device such that an outer end of the electronic device is approximately flush with a surface of the wooden structure, with the outer end of the electronic device being visible within the cylindrical cavity, wherein the size of the cylindrical cavity corresponds to the size of the electronic tracking device such that the electronic tracking device engages the cylindrical cavity in a friction-fit manner, wherein the electronic tracking device includes a power supply, an antenna, a location tracking device that detects position data of the wood shipping device, and a wireless communication device that communicates over a wireless network with a remote electronic device.

2. The system of claim 1, wherein the cylindrical protective case includes threads on the outer surface such that the cylindrical protective case is capable of being screwed into the cylindrical cavity.

3. The system of claim 2, wherein the cylindrical cavity includes threads on the inner surface adapted to engage the threads on the outer surface of the cylindrical protective case.

4. The system of claim 1, wherein the power supply of the electronic tracking device includes a battery.

5. The system of claim 4, wherein the battery is rechargeable.

6. The system of claim 1, further comprising potting material filling remaining space within the cylindrical cavity with the electronic tracking device embedded, wherein the potting material fills the cylindrical cavity such that the potting material is approximately flush with a circular face opening edge of the cylindrical cavity on the wooden structure.

7. The system of claim 6, wherein the potting material is an RF-friendly potting material.

8. The system of claim 1, wherein the wood shipping device is a wood pallet, a wood crate, or a wood skid.

9. The system of claim 1, wherein the wooden structure is a stringer, and the cylindrical cavity with the embedded electronic tracking device is positioned approximately midway between a midpoint of the stringer and an inner edge of a notch of the stringer.

10. The system of claim 1, wherein the wooden structure is a stringer, and the cylindrical cavity with the embedded electronic tracking device is positioned at an end of the stringer.

11. The system of claim 1, wherein the wooden structure is a block, and the cylindrical cavity with the embedded electronic tracking device is positioned approximately in the center of the block.

12. The system of claim 1, wherein the cylindrical cavity is created using a CNC machine or a mortising machine.

13. The system of claim 1, wherein the cylindrical cavity is created using a drill having a diameter approximately the same size as the diameter of the cylindrical electronic tracking device.

14. The system of claim 1, wherein the location tracking device of the electronic tracking device comprises a GPS unit.

15. The system of claim 1, wherein the wireless network over which the wireless communication device of the electronic tracking device communicates includes a LoRa WAN connection.

16. The system of claim 1, wherein the wireless network over which the wireless communication device of the electronic tracking device communicates includes a satellite connection.

17. The system of claim 1, further comprising a back-end system for processing data provided by the cylindrical electronic tracking device, wherein the back-end system for processing data includes the electronic device remotely located from the wood shipping device.

* * * * *